United States Patent

Thomson et al.

[11] Patent Number: 5,117,113
[45] Date of Patent: May 26, 1992

[54] DIRECT READING DOSIMETER

[75] Inventors: Ian Thomson, Nepean; Gary F. MacKay, Pictou County; Martin P. Brown, Ottawa, all of Canada

[73] Assignee: Thompson and Nielson Electronics Ltd., Ottawa, Canada

[21] Appl. No.: 549,156

[22] Filed: Jul. 6, 1990

[51] Int. Cl.$^5$ .................. H01L 27/14; H01L 31/112; G01T 1/02
[52] U.S. Cl. .................. 250/370.07; 250/370.14; 357/30
[58] Field of Search .................. 357/30 I, 30 G; 250/370.07, 370.14

[56] References Cited

U.S. PATENT DOCUMENTS

| | | | |
|---|---|---|---|
| 4,163,240 | 7/1979 | Swinehart et al. | 357/29 |
| 4,484,076 | 11/1984 | Thomson | 250/370.07 |
| 4,678,916 | 7/1987 | Thomson | 250/370.07 |
| 4,757,202 | 7/1988 | East | 250/370.03 |
| 4,841,349 | 6/1989 | Nakano | 357/301 |
| 4,976,266 | 12/1990 | Huffman et al. | 128/659 |

FOREIGN PATENT DOCUMENTS 1204885  5/1986  Canada .................. 250/370.07

OTHER PUBLICATIONS

"Semiconductor MOSFET Dosimetry", by M. H. Reece & I. Thomson, Health Physics Society, 1988 Annual Meeting.

Primary Examiner—Constantine Hannaher
Attorney, Agent, or Firm—Vorys, Sater, Seymour & Pease

[57] ABSTRACT

The invention relates to a radiation dosimeter having a pair of insulated gate field effect transistors integrated into the same silicon substrate, in which each of the transistors are operable in a bias mode and a test mode. A circuit element for biasing each of the transistors, during said test mode is provide, so that one of the transistors is more sensitive to ionizing radiation than the other of the transistors. A circuit element is provided for determining, during the test mode, the difference in the threshold voltages of the transistors, whereby the difference voltage is indicative of the radiation dose, and a circuit element is provided for continuously switching the transistors between the bias mode and the test mode, whereby the period of operation of the transistors in the test mode time period is small in comparison to the period of operation of the transistors in the bias mode.

24 Claims, 8 Drawing Sheets

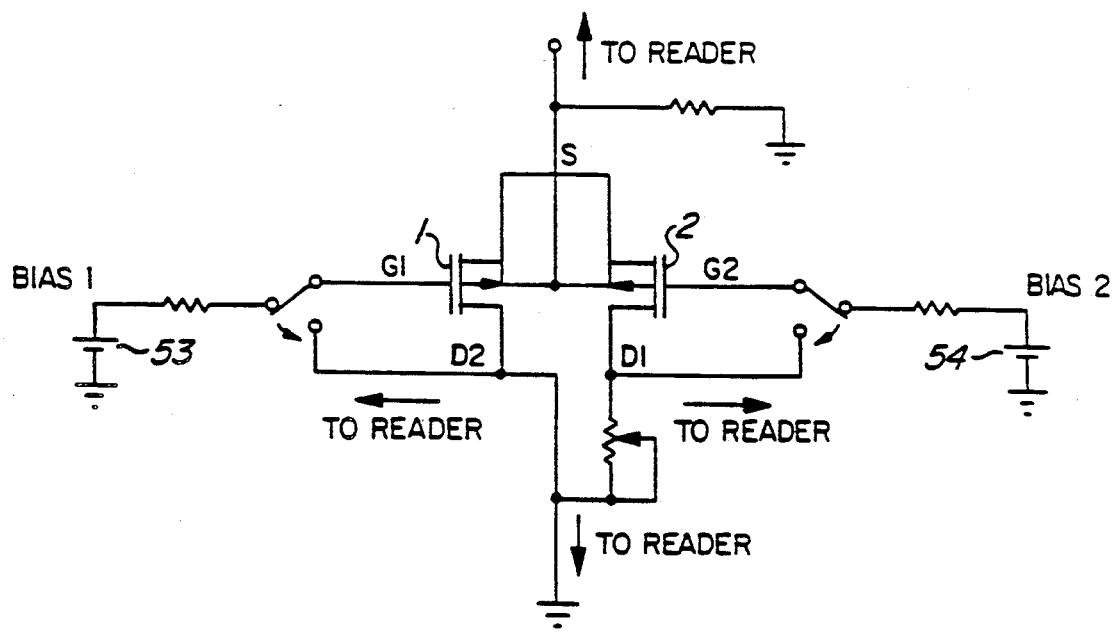
FIG. 5
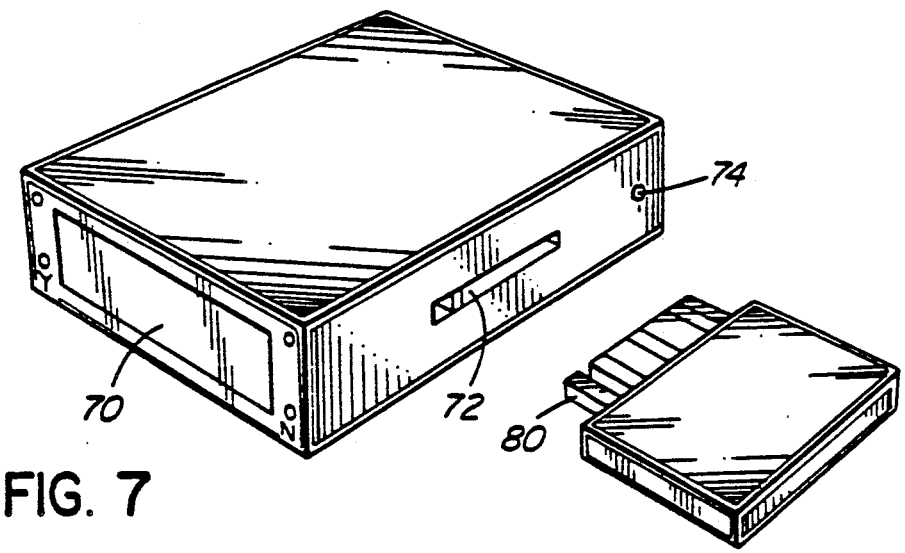
FIG. 7
FIG. 8

DIRECT READING DOSIMETER

FIELD OF THE INVENTION

This invention re to dosimeters utilizing Metal Oxide Semiconductor Field Effect Transistors (MOSFETS) for detecting and quantifying ionizing radiation. Such dosimeters have application as personal dosimeters for protection of workers potentially exposed to harmful radiation, military personal and in the radiotherapy area.

BACKGROUND OF THE INVENTION

The theory and principles of use of MOSFETs for detection of radiation is well known. It is understood that the threshold voltage of a MOSFET or, as it is sometimes called an insulated gate field effect transistor, (IGFET) varies with exposure to radiation and therefore provides a useful building block in the design of dosimeters.

On Nov. 20, 1984 U.S. Pat. No. 4,484,076 issued with Ian Thomson as inventor. The patent discloses a metal oxide semiconductor device, the threshold voltage of which provides the accumulated dose at any particular period of time. A differentiator is also used to provide the dose rate. Canadian Patent 1,204,885 issued May 20, 1986 to the same inventor. It describes a further advanced dosimeter using two MOSFETs and measuring the difference in the threshold voltages of the transistors. This value is indicative of the total accumulated dose of radiation to which this device was exposed. This provided a significant advance in the art in that the differential technique lessened the deleterious effects relating to stability common to both transistors.

The inventor and M. H. Reece in a paper entitled *Semiconductor MOSFET DOSIMETRY* published in the proceedings of the Health Physics Society 1988 Annual Meeting present the structure and operation of MOSFET dosimeters. The paper discloses experimental results with respect to response to radiation of different kinds and discusses application of such devices. The paper provides useful background information for this application.

Canadian Patent No. 1,204,885 issued May 20, 1986 again with Ian Thomson an inventor, discloses a direct reading solid state dosimeter which will measure neutron and gamma radiation. A dual metal oxide semiconductor field effect transistor (MOSFET) is used as a gamma sensor and a forward biased PIN diode as a neutron sensor. A liquid crystal display is provided for displaying the gamma and neutron radiation dosage. The basic operation of the circuit is effect by insulated gate field effect transistors, having their drains connected together. A battery or some other device provides bias potential between the gate, drain, and source of the first transistor, while the gate and drain of second transistor are connected together.

Another patent in the dosimeter field is East U.S. Pat. No. 4,757,202 dated Jul. 12, 1988. This patent discloses a dosimeter comprising a dual MOSFET as a gamma sensor and a forward biased PIN diode as a neutron sensor. A liquid crystal display is used to display the accumulated dose.

There are a number of applications that require ionizing radiation dose to be measured to a high degree of accuracy. Consequently, the radiation dosimeters which are used to make these measurements have to exhibit a high degree of accuracy and stability, especially where there is a wide variance in ambient temperature. An example of this is the use of a personal dosimeter for monitoring fire fighters and police who have to work in or near accidental radiation environments. Those dosimeters should have a sensitivity of approximately 0.010 cGy(rad). In an accident situation, a nuclear worker is allowed up to 1 cGy per body dose. The accumulated dose over a period of time is also a critical measure because Federal regulations state that the maximum body dose allowed over a one year period is 5 cGy.

Another example is in the area of radiotherapy, where dosimeters are used to calibrate the beam profiles of radiation treatment equipment and to monitor patients exposed to doses of radiation. These instruments must therefore be stable to within 5%. Typically, doses range from a few cGy to a few thousand cGy.

A third application is in military personal dosimeters, which are required to have a range of 1 cGy to 2000 cGy with re-zeroing capabilities. They should also be stable over the temperature ranges of operation which typically varies from $-20°$ to $+50°$ celsius.

A technique of measuring radiation dose makes use of an insulated gate field effect transistor (IGFET) or a MOSFET as otherwise commonly known, as a radiation sensor. Radiation causes a shift in the threshold voltage of the IGFET. This change in threshold voltage is measured and represents the radiation dose received.

In its basic form, this type of prior art dosimeter consists of two silicon insulated gate field effect transistors which share the same substrate, each having a gate, a source and a drain. A differential threshold voltage between the transistors is measured and stored. The gate of the first transistor is biased positively with respect to its source, drain and substrate, while the gate of the second transistor is held at a slightly decreased bias with respect to its own source, drain and substrate. The device is now sensitive to ionizing radiation and will respond when exposed. A differential threshold voltage is measured again between the transistors and stored. The difference between the threshold voltages indicates the measure of the radiation dose.

IGFETS, however, exhibit a number of problems which limit their use in personal and/or radiotherapy dosimeters. In switching on a P-channel IGFET, there occurs a small threshold voltage drift. Typically a threshold drift has been measured at 30 mV, maximum, in unradiated devices. This phenomenon is associated with the slow surface states located at the silicon/silicon dioxide interface of the IGFET. This effect is particularly pronounced in highly irradiated devices and can be in the order of 500 mV (corresponding to 500 cGY or greater).

Though these slow surface states effect both IGFETS in the same manner, there still exists a differential threshold voltage drift. This shift can be as low as 10 mV (corresponding to 10 cGy), and as high as 122 MV (122 cGY) depending on the radiation history of the dual device. This is an unacceptably low degree of stability for a low dose personal dosimeter, highly accurate medical instrument or laboratory dosimeter.

A second problem associated with the prior art is the difficulty of tracking two current sources with temperature. Separate current sources were used in the prior art dosimeters to provide a constant source to drain current to whichever one of the two IGFETs was being measured for threshold voltage. An approximate 1% change in the source to drain current results in a 20 millivolt shift in threshold voltage.

A third problem associated with the prior art is that the circuit does not allow for continuous reading capabilities. Emergency, military, and medical dosimeters should be continuous reading which gives the user the option of incorporating an alarm if desired. Such dosimeters also should have a rezeroing capability.

It is an object of this invention to provide a dosimeter for measuring ionizing radiation and particularly to a dosimeter having substantially improved accuracy and overcoming the problems of the prior art dosimeters as outlined above.

SUMMARY OF THE INVENTION

The invention as claimed is a radiation dosimeter comprising a pair of insulated gate field effect transistors integrated into the same silicon substrate, each said transistor being operable in a bias mode and a test mode; means for biasing, during said test mode, each said transistor so that one of said transistors is more sensitive to ionizing radiation than the other of said transistors; means for determining, during said test mode, the difference in the threshold voltages of said transistors, said difference voltage being indicative of the radiation dose; and means for continuously switching said transistors between said bias mode and said test mode, the period of operation of said transistors in said test mode time period being small in comparison to the period of operation of said transistors in said bias mode.

The present invention solves the problems of continuous direct reading capabilities and stability of the prior art. The dual IGFET described in the present case is connected to test or bias circuits and operates in a test or bias mode. In the test mode the differential threshold voltage of the transistors is measured and in the bias mode the transistors are biased with a predetermined bias so that one is more sensitive to radiation than the other. In the bias mode a high and low bias is applied to the first and second transistors respectively, thus turning them off, while exposing the transistors to ionizing radiation. After the bias mode, the IGFETS are switched to the test mode in which the threshold voltage of both IGFETs are measured and stored on two sample-and-hold capacitors respectively. One sample-and-hold capacitor stores the threshold voltage of the first IGFET while the second stores the threshold voltage of the second IGFET. In a preferred embodiment, one transistor threshold voltage is measured and sampled in one test period. The bias mode period represents 98% of the combined bias and test periods. The operation time involved for the test period takes the remaining approximately 2% of the total test/bias cycle. Thus, for 2% of the time, the IGFETs are fairly insensitive to ionizing radiation. To monitor the differential threshold voltage a digital voltmeter is connected across the two sample-and-hold capacitors of the sample and hold circuitry. The accumulative dose received by the IGFETS is proportional to the difference in the digital voltmeter readings before and after radiation. A resistor network can be incorporated into the circuit so that the dosimeter can be re-zeroed before each radiation measurement.

The continuous testing allows a display to show the current dose visually and continuously. Prior art devices required the sensor to be mechanically placed or switched into a test circuit before the dosimeter could be read. Another prior art device disclosed in the East patent referred to above required a button to be manually activated every time it was desired to read the device.

Another inherent advantage to this test/bias configuration and mode of operation is that the threshold voltage drift is minimized when the IGFET is turned on, and then off. Slow surface states begin to fill up about 10 milliseconds after the device has been turned on and saturate several hundred seconds later. The IGFETs in the continuous direct reading dosimeter of this invention are in the test mode for only 3 milliseconds in one of the preferred embodiments. This does not allow the slow surface states enough time to fill up, thus minimizing the device's threshold drift.

In another embodiment an additional advantage is achieved by using a single current source to provide source to drain current to both of the IGFETS. This ensures that each device has the same source to drain current independent of temperature and any drift in current due to temperature will be experienced equally by both transistors.

It may be found that there remains a threshold difference between the two transistors or an initial offset. To overcome this, a variable resistor can be connected in series with the drain circuit of the transistor with the lower bias during the bias mode, to precisely set to zero the difference in measured threshold voltage between the transistors. As indicated above this re-zeroing capability is useful in calibrating the device and is a requirement for military personal dosimeters.

A further embodiment of the invention is a passive dosimeter constructed using two button batteries to bias the gates of the first and second dual IGFETS. The device can be small and in locket or badge form to be carried on the person and can be read by plugging it into the continuous direct reading dosimeter circuits whereby the passive dosimeter's accumulative dose can be read. The measured differential threshold voltage is displayed in a direct reading digital voltmeter.

BRIEF DESCRIPTION OF THE DRAWINGS

A better understanding of the invention will be obtained by the reference to the detailed description below in connection with the following drawings in which:

FIG. 5 is a schematic drawing of a passive dosimeter for use in a direct reading circuit;

FIG. 7 is a perspective drawing of a continuous direct reading dosimeter according to an embodiment of the present invention;

FIG. 8 is a perspective drawing of a passive dosimeter according to an embodiment of the present invention;

DETAILED DESCRIPTION OF THE PREFERRED EMBODIMENT

Figure 1A:
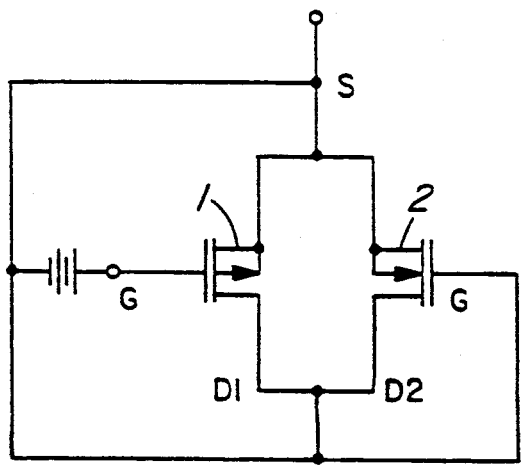
FIGURE 1A is a schematic diagram of a pair of IGFETs in a circuit ready for radiation according to the prior art.

FIGURE 1A illustrates the basic embodiment of the prior art circuit using a pair of IGFETS, and prepared for irradiation. Two IGFETs 1 and 2 have their sources connected together at S and their drains D1 and D2 connected together. A battery or some other device to provide bias potential is connected between the gate of IGFET 1, on the one hand, and at the drains, sources and gate of IGFET2, on the other hand. The gate of IGFET 2 is connected to drain D2. Both IGFETs are of the same type and are fabricated in the same die in order that they may have the same temperature variation characteristics, the same substrate resistivity and the same slow surface states prior to irradiation. Both IGFETs are exposed to the same ionizing radiation. It has been found that more charge will accumulate in the gate of the biased IGFET 1 compared to that of the unbiased IGFET 2, shifting its threshold voltage.

Figure 1B:
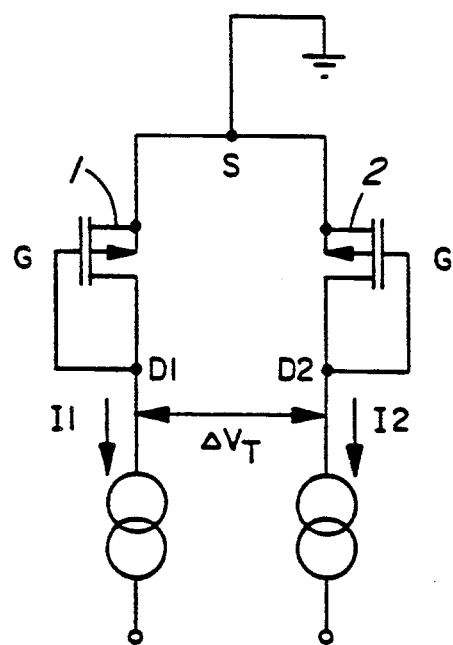
FIGURE 1B is a schematic diagram of a pair of IGFETs in a circuit prepared in order that a RADIATION dose can be read according to the prior art.

FIG. 1B illustrates the same IGFETs 1 and 2 as in FIG. 1A, in a circuit prepared in order that the dose can be read. The sources of the IGFETs are connected together, but the drains are not. The gate of IGFET 1 is connected to its own drain D1 and the gate of IGFET 2 is connected to its own drain D2. A DC current source $I_1$ is connected to the drain D1 and another source of DC current $I_2$ is connected to the drain D2. Both sources of current pass through the common source connection S, thereby causing current $I_1$ to pass through IGFET 1 and current $I_2$ to pass through IGFET 2. Both currents should be the same value.

A voltage delta $V_T$ is measured across the drain D1 and D2. This is the differential threshold voltage between the transistors. The difference between the differential threshold voltage prior to irradiation and the differential threshold voltage following irradiation is directly proportional to the dosage received.

As noted earlier, despite the direct reading capabilities of the prior art dosimeters, they lack a continuous read-out capability and have an inherent problem with stability. It will also be seen that there is a difficulty in tracking of the two current sources with temperature and other variations.

Figure 2:
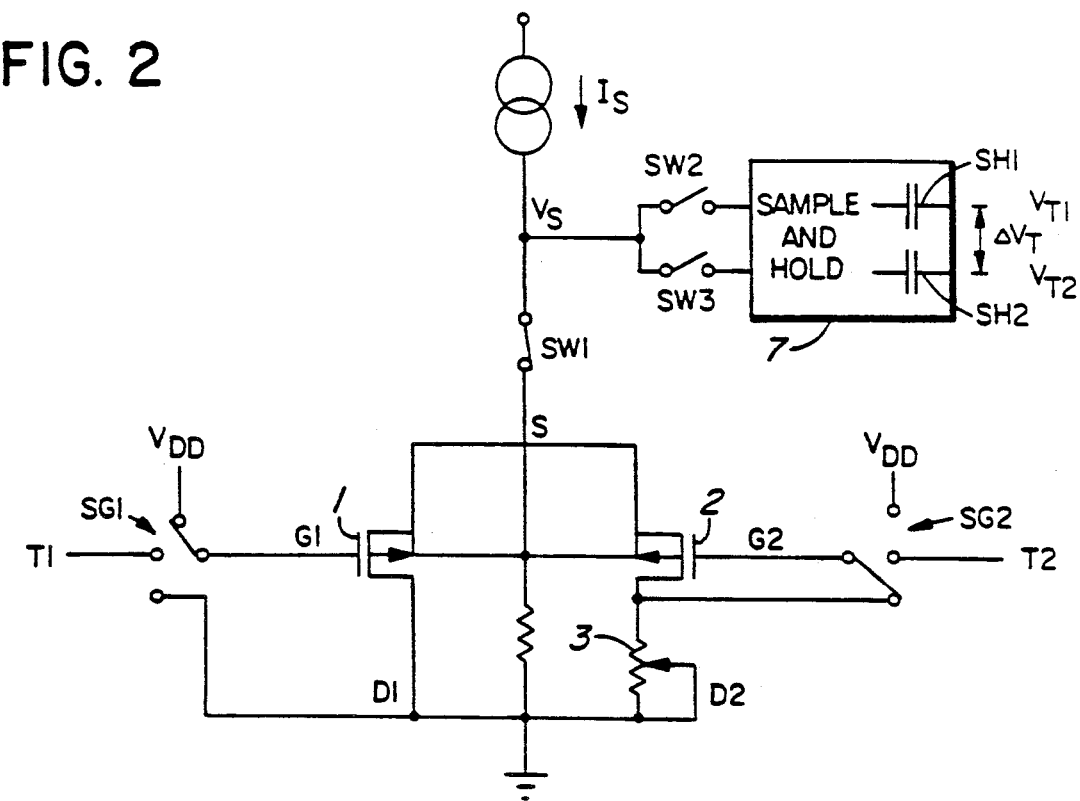
FIG. 2 is a schematic of a circuit according to the present invention in its form prepared for measurement of dosage.

Referring to FIG. 2, the basic embodiment of the present invention in the test mode. As can be seen a similar dual IGFET configuration is used. Two IGFETs 1 and 2 have their sources connected together at S. A potentiometer 3 is connected in the source drain circuit of IGFET 2. The substrate of each of the IGFETs is connected to the common source connection S and it is also connected via a resistor to ground. A current source $I_s$ is connected by a switch $SW_1$ to the common source connection S. When the switch $SW_1$ is closed, the current source $I_s$ is connected to the substrate and holds the substrate at a source potential Vs. A first sample-and-hold capacitor SH1 can be connected by a first switch $SW_2$ to the current source $I_s$. A second sample-and-hold capacitor SH2 is connected via a second switch $SW_3$ to the current source $I_s$. The gate G1 of IGFET 1 is connected via a switch $SG_1$ to a source of positive potential thereby turning off the device. The gate G2 of IGFET 2 is connected via a switch $SG_2$ to its drain D2 thereby turning the device on. IGFET 1 does not conduct current as its gate G1 is held high with respect to the substrate and IGFET 2 conducts current as its gate is held low with respect to the substrate. The voltage across the source and drain D2 is stored in the sample-and-hold capacitor SH2, which is a measure of the threshold voltage VT2 of IGFET 2. IGFET 2 is then shut off by connecting its gate G2 via switch $SG_2$ to a positive supply $V_{dd}$ and IGFET 1 is turned on by connecting its gate G1 to its drain D1 via the switch $SG_1$. The voltage across the source and drain is stored in the first sample-and-hold capacitor SH1, being threshold voltage VT1 of IGFET 1. The potentiometer 3 enables us to make the measured threshold voltage of the second transistor equal to the measured threshold voltage of the first transistor, thus giving the dosimeter re-zeroing capabilities.

Subtracting VT2 from VT1 will give the differential threshold voltage of the transistors. This is a representation of the dose received.

Both IGFETs are preferably the same P-channel type, and are prefabricated in the same die in order that they should have the same temperature variation characteristics, the same substrate resistivity and the same slow surface states prior to irradiation. Preferably, the gate oxide of each IGFET should be greater or equal to approximately 0.5 microns, i.e. being a thick oxide IGFET.

Figure 3:
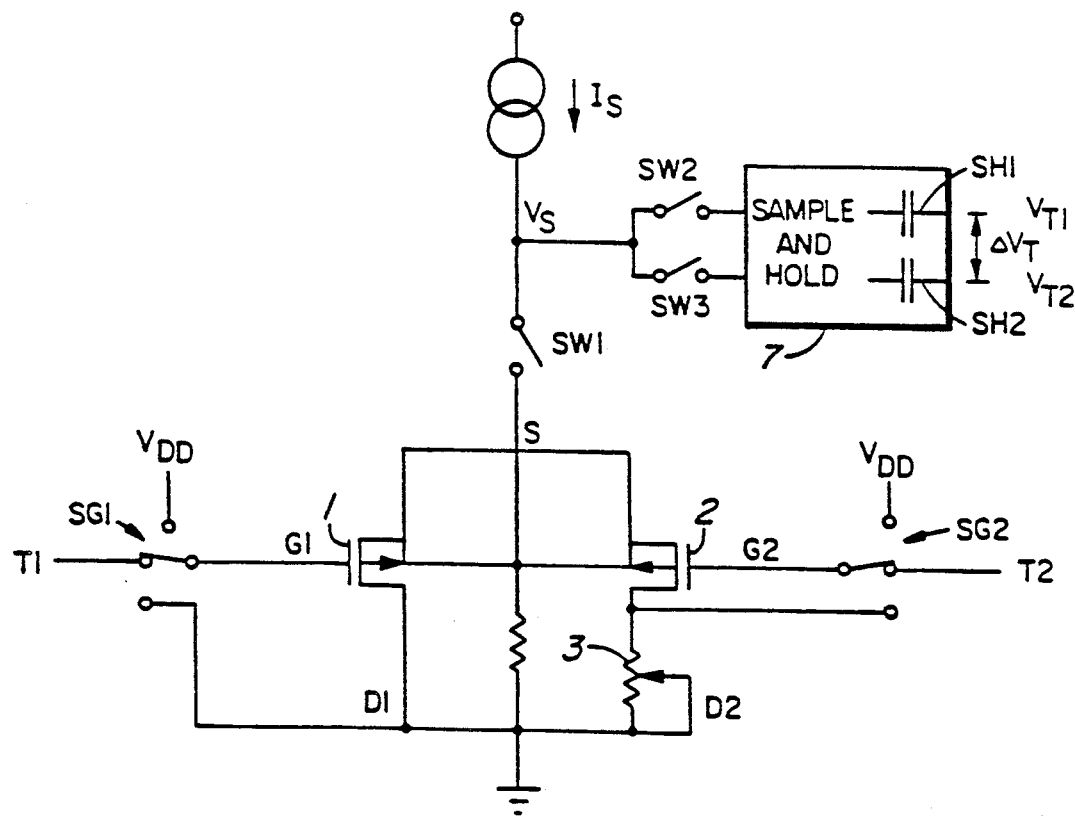
FIG. 3 is a schematic of a circuit according to the present invention in its form prepared for irradiation.

Referring now to FIG. 3, the circuit of FIG. 2 is shown in the bias mode. In the present configuration, the IGFET 1 and IGFET 2 are subjected to ionizing radiation. In order to do this, the current source $I_s$ is disconnected by opening the switch $SW_1$ from the common source connection S. The gates of IGFET 1 and IGFET 2 are connected to a bias potential of 6 V and 3 V respectively. The potential of the bias voltages with respect to the substrate affects the sensitivity of the devices to ionizing radiation. It has been found that the given 6 volts to 3 volts configuration corresponding to the bias potential of IGFET 1 and IGFET 2 respectively gives the dosimeter the sensitivity of approximately 1 mV/cGy. Increasing the ratio of these biases increases the dosimeter's sensitivity. As has been previously stated, more charge will accumulate under the gate of the higher bias and IGFET compared with that of the lower biased IGFET, thereby causing a greater shift in the higher biased transistor's threshold voltage.

The switches used to switch the current source $I_s$, the sample-and-hold capacitors, and the gates of the IGFETS, are all CMOS devices. A detailed description of the implementation of these switches in a circuit will be shown later. These switches are controlled by a clock running at a frequency of 640 hertz.

Figure 4:
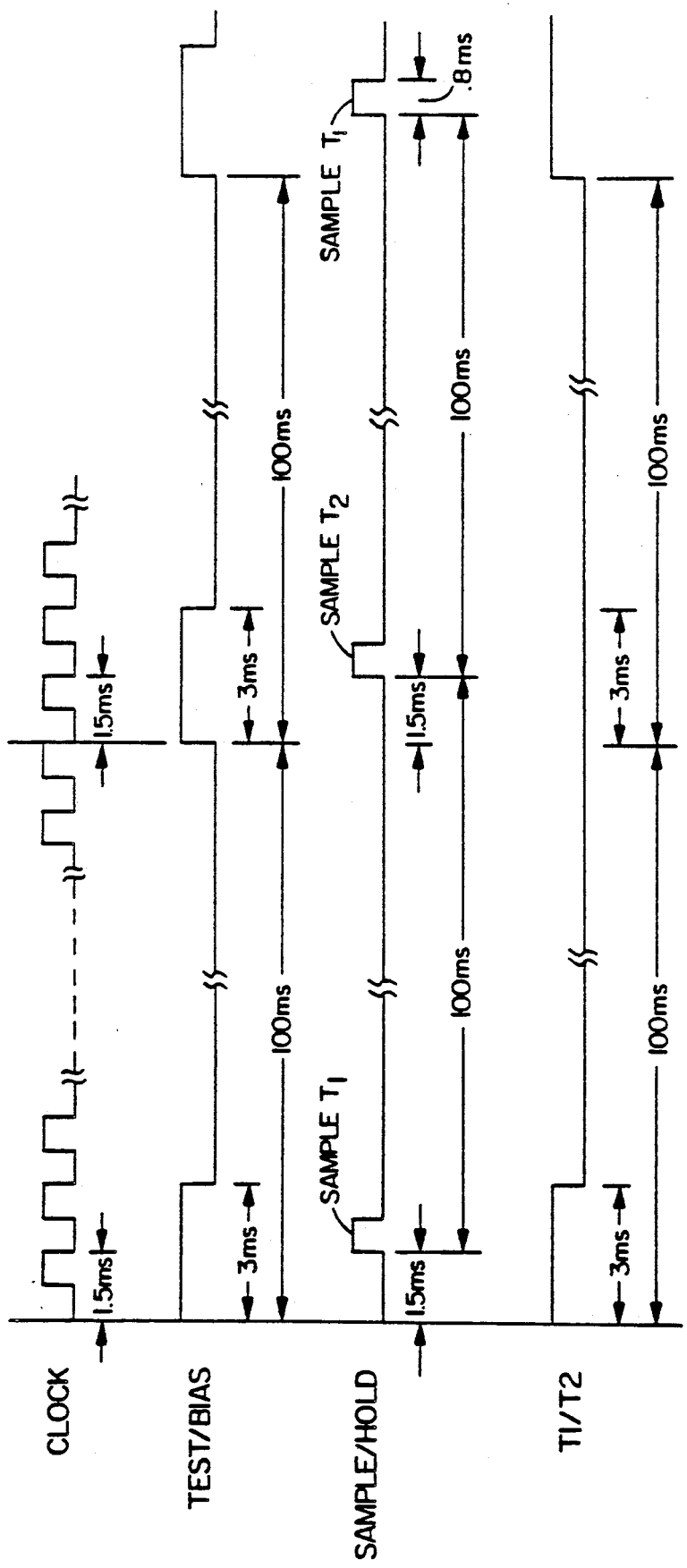
FIG. 4 shows timing waveforms for switching between various modes of operation.

Referring to FIG. 4, a series of timing waveforms are shown. A constant frequency clock pulse of 640 hertz forms the basic clock frequency of the circuit. The test period, for which the circuit, as displayed in the configuration of FIG. 2, is shown by the test/bias waveform. The test period lasts for two cycles or 3 milliseconds. During the test period, the threshold voltage of either IGFET 1 or IGFET 2 is being measured. A timing signal indicated by T1/T2 shows when transistor 1 or transistor 2 is being tested. When the T1/T2 level is high, IGFET1 is being tested IGFET 1, whereas when the T1/T2 level is low, IGFET2 is being tested. The timing of the sample-and-hold capacitor is shown by the Sample/Hold waveform. The Sample/Hold level goes high at 1.5 milliseconds into the test period, and is high for 0.8 milliseconds, which is sufficient time for the sample-and-hold capacitor to charge up. The delay of 1.5 milliseconds in starting the sampling process gives the threshold voltage enough time to stabilize. After the three millisecond test period, the test/bias signal goes low for 97 milliseconds. During this time, the circuit is in the bias mode configuration as shown by FIG. 3 above. After this bias period, the test/bias level goes high for a period of 3 milliseconds, however, the T1/T2 level is low, thus, testing the threshold voltage of IGFET2. Once again, the sample-and-hold signal goes high for 1.5 milliseconds into the test period for a duration of 0.8 milliseconds, to charge up the second sample-and-hold capacitor. A complete measurement cycle in which the threshold voltages of both transistors are measured is 200 milliseconds. The period of 200 milliseconds was found to be sufficiently short so as to prevent any significant drop in the sample-and-hold capacitor's voltage with time. Also, this does not allow the slow surface states enough time to fill up and, thus, minimizes the device's threshold drift since, as mentioned earlier, slow surface states begin to fill up after about 10 milliseconds of the device being turned on and saturates several hundred seconds later.

Referring to FIG. 5, a representation of a passive dosimeter for use with an embodiment of a continuous direct reading dosimeter of the present invention is shown. It can be seen that the circuit configuration for the IGFETs is the same as that described in FIGS. 2, however, the method of biasing the IGFETs as well as measuring the threshold voltages is different. Two button batteries 53 and 54 provide the bias to the gates of IGFET 1 and IGFET 2 respectively. The passive dosimeter can be small and in locket or badge form capable of being worn by a person. In order to read the device, it is plugged into the circuit of a continuous direct reading dosimeter specially configured to provide appropriate physical and electrical connections so that an accumulated dose can be read.

In a preferred embodiment of a continuous direct reading dosimeter operating in the test/bias mode, a continuous reading of the radiation dose to which it is being or has been exposed is displayed. The passive dosimeter can be physically connected to this device and electrically connected to the test portion of the circuitry so that testing can take place and the passive dosimeter's dose displayed.

Figure 6A:
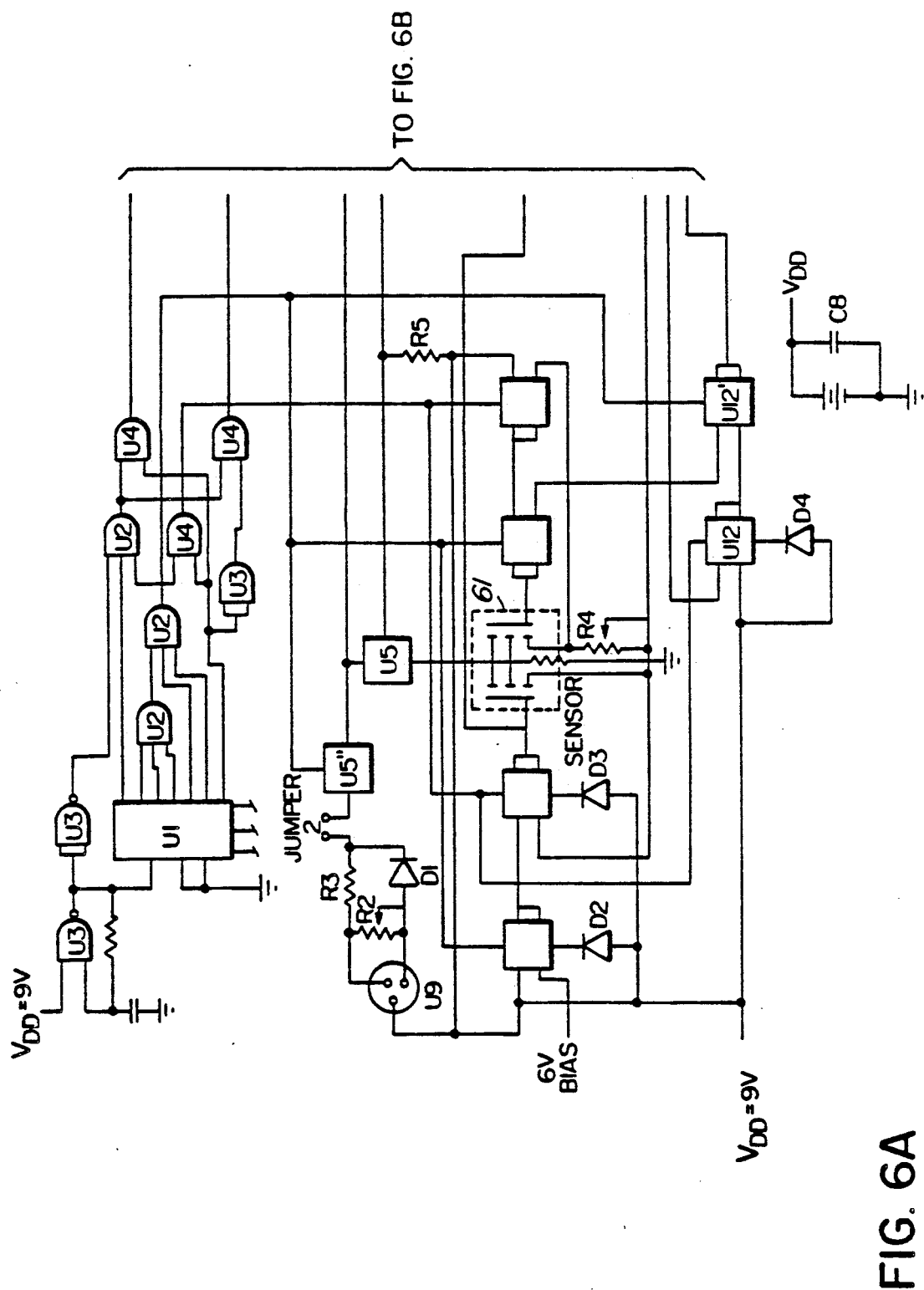
FIGS. 6A and 6B are a detailed circuit diagram for one embodiment of the invention.
Figure 6B:
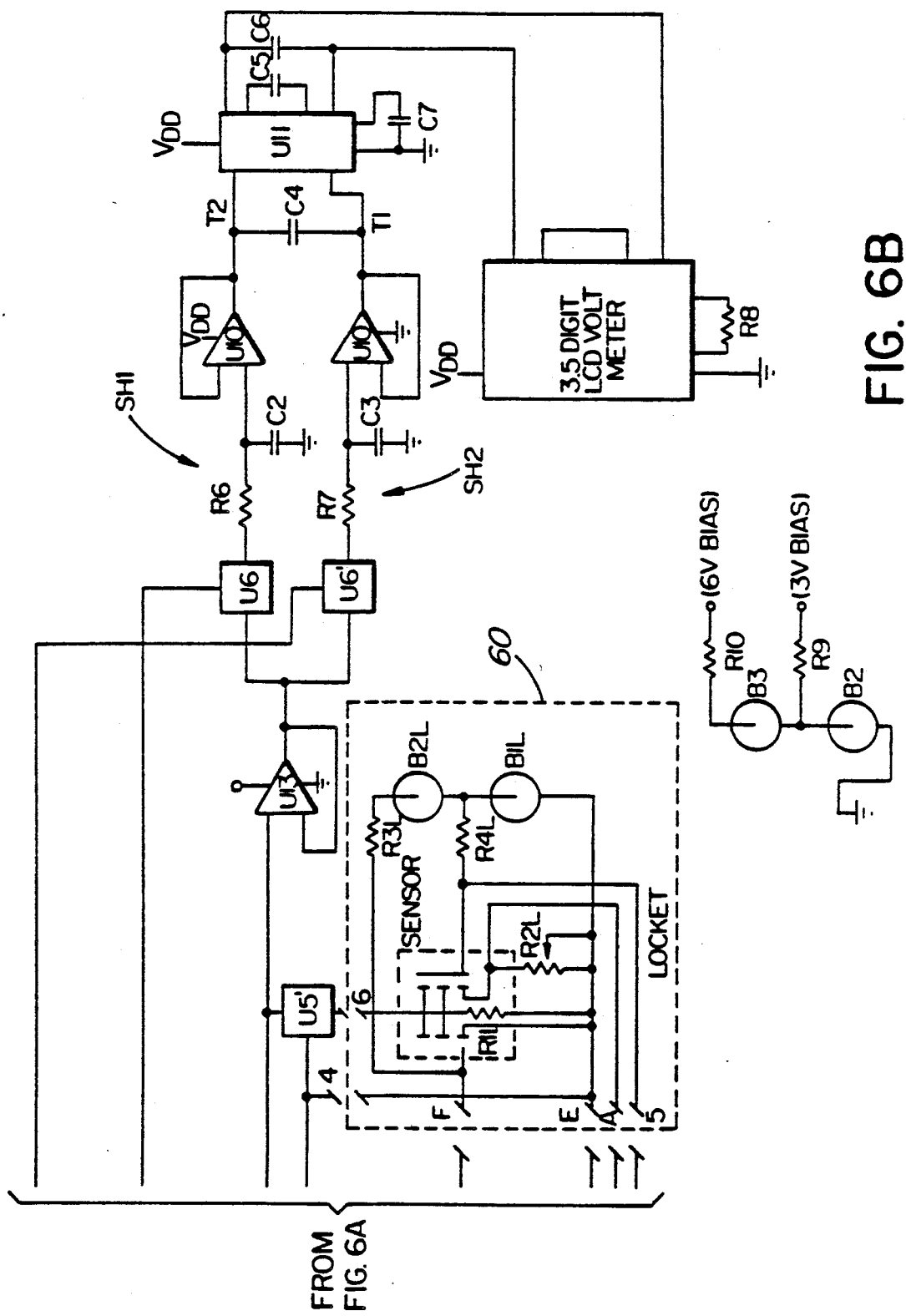

A more detailed schematic diagram of the dosimeter, according to a preferred embodiment of the invention, is shown in FIGS. 6A-6B. The circuit diagram includes both the continuous direct reading dosimeter and an embodiment of the passive dosimeter. The circuit of the latter being identified by numeral 60.

The dual IGFET sensors used in this particular circuit are custom devices with identification numbers TNMOS which are configured in an eight pin dual-in-line package. These are P-channel devices. The constant current source is implemented by using a current reference semi-conductor U9 (LM134H) and its associated trimming circuitry. The current is set by variable resistor R2 to approximately 100 micro-amps. The CMOS supply potential for the circuit is derived from a battery of 9 volts having a smoothing capacitor C8 of 100 microfarads in parallel with it. The bias for IGFET 1 and IGFET 2 is provided by two three volt batteries connected in series which in configuration with resistors R9, R10 provide 6 volt and 3 volt biases respectively. The clock frequency for the circuits is provided by a CMOS counter U1 (4024).

An RC square-wave generator formed around a NAND gate U3 and resistors R1 and C1 of 150k and 0.01 microfarad, respectively, to give a clock frequency of 640 hertz. The outputs of Integrated Circuit U1 are decoded by a series of gates to produce the timing signal described previously in FIG. 4.

The gate of IGFET 1 is connected to be switched between $V_{dd}$ supply, 6 volt bias and its drain, by the use of CMOS switches. These switches are available in a CMOS package of quad switches (DG307A). Similarly, the gate of the IGFET 2 is switchable between the supply 3 volt bias and its drain by a second set of CMOS switches. The connection for these switches is fairly straight forward and can be readily seen in FIG. 6B. The threshold voltage, when read, is fed by a buffer amplifier U13 to a pair of sample-and-hold circuits via individual CMOS switches U6 and U6'. The control of these switches U6 and U6' is obtained from the logic decoding circuitry connected with U1 to individually route the threshold voltage signal of the appropriate transistor to either sample-and-hold circuit SH1 or sample-and-hold circuit SH2 The sample-and-hold circuit comprises resistor R6 connected to a capacitor C2, the other terminal of which is connected to ground. The common point of connection between the resistor and capacitor is connected to the input of the buffer output U10. The output of U10 is then fed into one part of a differential circuit U11. The second sample-and-hold circuit is formed by resistor R7 connected to capacitor C3 to ground and having the common connection point, in turn, taken to an output U10 having its output connected to the negative input of U11. The output of the differentiator U11 is fed into a 3½ digit Liquid Crystal Display voltmeter circuit which includes an analog-to-digital converter.

In addition to the above circuit, an automatic switching circuit is available which, when activated, disconnects the IGFETs sensor 61 from the circuit and allows the passive IGFET sensor indicated by block 60 to be read.

This is implemented by CMOS switches U12 and U12'. As can be seen by the diagram, the passive IGFET sensor is also comprised of a TNMOS dual IGFET chip. This chip in turn is biased by its own button batteries B2L and B1L shown in the diagram. The passive dosimeter is automatically connected into the circuit to have its threshold voltages read via the CMOS switch U5'. Without the passive IGFET sensor connected, CMOS switch U5 is kept closed by having its control line held high through resistor R5, while CMOS switch U5', which connects to terminal connector 6 is kept open by a high voltage applied to its control line, since its control line is inverted with respect to that of U5. When the passive IGFET sensor 61 is connected to be read as connected E is taken to ground, which in turn forces the connector 4 to ground. Connector 4 forces the control line of U5 U5 low. Thus, opening switch U5 and closing switch U5' effectively connecting the current source to the passive dosimeter via connector 6 and disconnecting it from the continuous reading dosimeter sensor 61. Additional contacts are provided labelled FEA5 which provide the ground and positive supply signals to the passive dosimeter when it needs to be read.

Turning now to FIG. 7, the housing of a preferred embodiment of the continuous direct reading dosimeter is shown, being a box of dimensions 11 cm long by 3.5 cm high by 6.5 cm wide. A liquid crystal display 70 is installed on one face of the box and an adjacent face has an edge connector installed in it. The edge connector 72 enables the connection of a passive dosimeter to the unit for reading the dose of the passive dosimeter. This would be of use in a situation where a group of workers would be carrying out their duties in a potentially hazardous radiation zone. One of the group would be equipped with a preferred embodiment pocket size continuous direct reading dosimeter which would give a continuous reading of the radiation dose it received as well as sounding an alarm when a certain predetermined level was reached. The other workers could use badge type passive dosimeters. Each of these could be checked immediately by connection to the pocket sized unit.

An opening 74 is provided through the box enclosure to the potentiometer R4 in order to rezero the dosimeter reading.

FIG. 8 is a schematic diagram illustrating a PREFERRED EMBODIMENT passive dosimeter. The dimensions of this enclosure are 7 cm deep by 5 cm wide and 0.5 cm high. A male edge connector 80 is provided at one end of the enclosure, to mate with the female connector 72 of the direct reading dosimeter described in FIG. 7. The signal lines are as described in FIG. 6 above.

Figure 9:
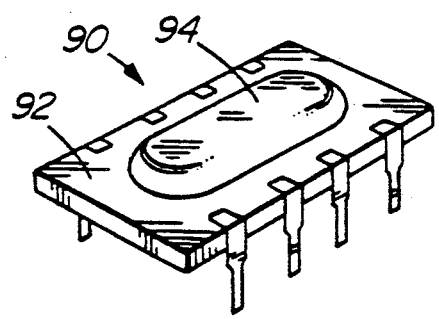
FIG. 9 is a perspective view of the physical package of a sensor.

Referring to FIG. 9, a view of the IGFET sensor is shown generally by numeral 90. Most commercial electrical component packages are made of metallic or ceramic material which would induce a dose enhancement effect and degrade the energy performance of the dosimeter. Dose is defined as the energy per unit mass absorbed by a material during exposure to a radiation environment. Photons lose energy by interacting with electrons in the material, resulting in a transfer of energy from the photons to the electrons. The electrons then lose their excess energy by collisions with other electrons in the material, resulting in a large number of secondary electrons with various energies.

X-rays with energies less than 1 Mev produce larger enhancement effects than gamma rays with energies of 1 Mev (Cobalt-60). X-rays interact with matter primarily by the photoelectric effect, in which the photon is totally absorbed by an atom and the atom emits an electron. This process is strongly dependent upon the atomic number of the incident material, being largest for high −Z materials. At a high −Z material/silicon dioxide interface there are many more electrons generated within the high −Z material. The electrons penetrate into the $SiO_2$ enhancing the deposited dose within it. The dose distribution is approximately the same for X-rays traversing the interface in either direction since the photoelectric effect emits electrons isotropically.

Dose enhancement effects are much less for gamma rays (>1 MeV) due to their higher energy. Gamma rays interact with matter primarily via the Compton effect, in which the photon collides with electrons in the material. The process is largely independent of the atomic number of the material, thus gamma rays produce approximately the same number and spectrum of electrons in any material. The dosimeter should have a normalised response from 70 KeV to 1 MeV. To reduce any dose enhancement effects at low energies the IGFET sensor is surrounded with low −Z material. The IGFET substrate is mounted on a printed circuit board material 92 and is covered with a plastic type material 94.

Figure 10:
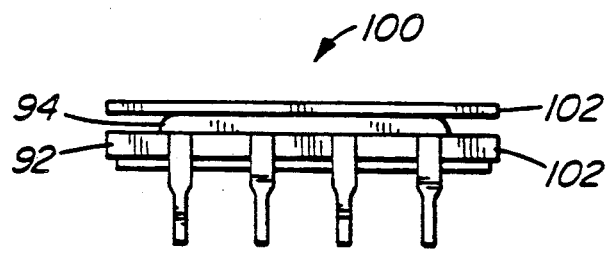
FIG. 10 is a cross-sectional view along the line A—A.

Referring to FIG. 10, a cross-sectional view on A—A of the IGFET sensor in FIG. 9 is indicated generally by numeral 100. It was necessary to obtain a normalised response from 50 KeV to 1 MeV. In order to achieve this the IGFET substrate once again is mounted on a printed circuit board 92 and covered with a plastic material 94. However the entire dual-in-line package is covered on the top and bottom by a 0.5 mm tin filter 102. It has been found that this tin filter flattens the response of the sensor giving it an even sensitivity to high and low energy radiations.

Figure 11:
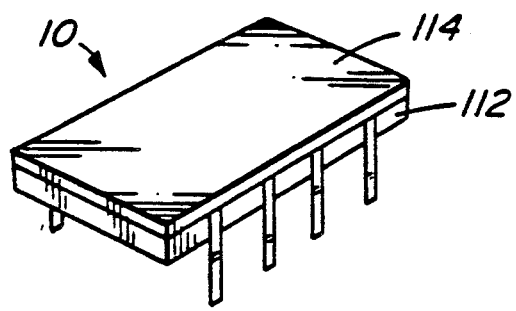
FIG. 11 is a perspective view of a further embodiment of a sensor.

Referring to FIG. 11, a further embodiment of an IGFET sensor is shown generally by numeral 110. Within the energy 30 KeV to 100 KeV dose enhancement of approximately 30 can be obtained. This is possible if one uses a commercial package with a high −Z KOVAR TM lid. The sensor is bonded to the bottom of a ceramic package 112 and a KOVAR TM lid is 114 is placed on top. The KOVAR TM lid enhances the dose absorbed by the silicon dioxide.

Figure 12:
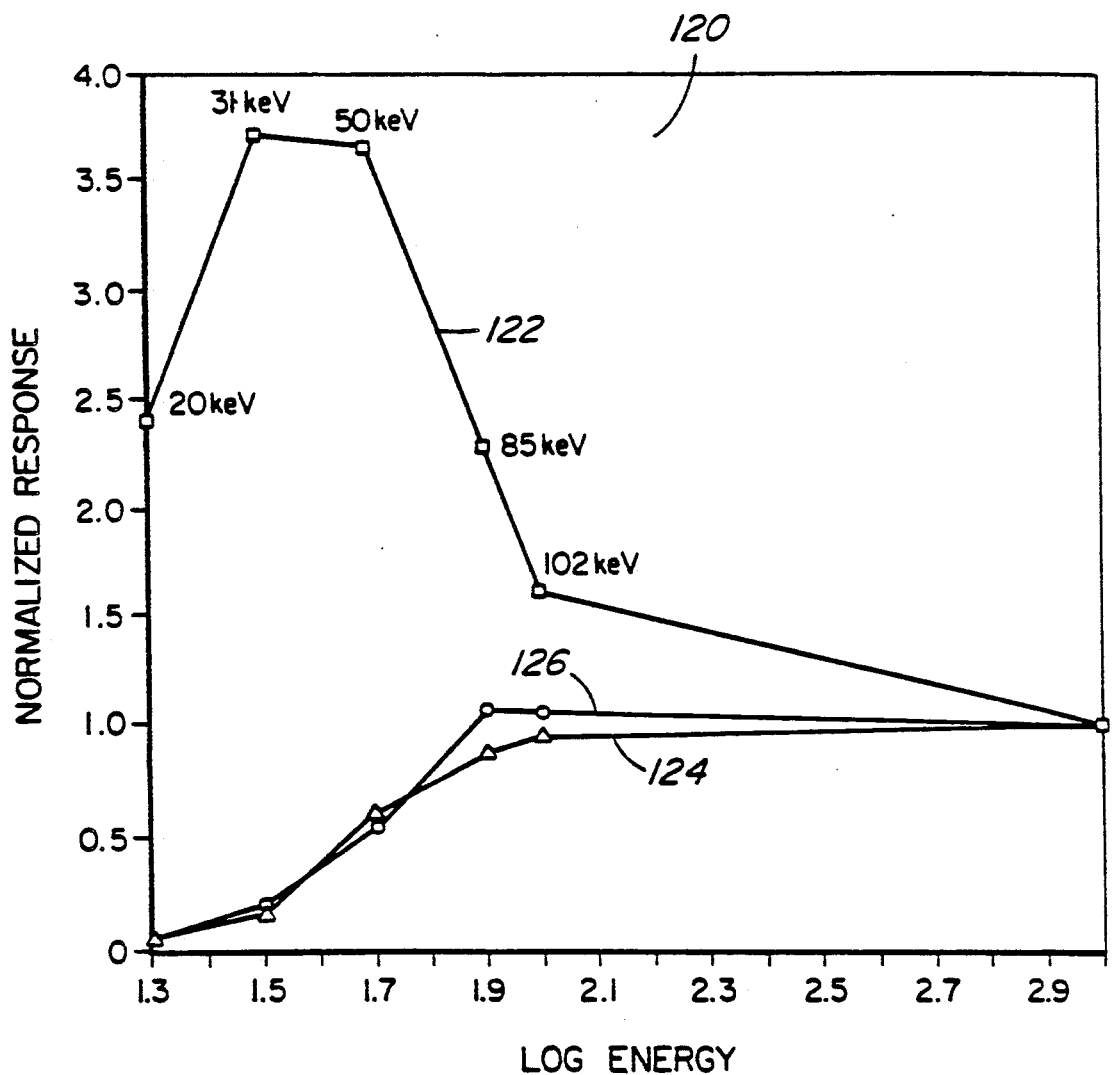
FIG. 12 shows the directional sensitivity of the direct reading dosimeter.

Referring to FIG. 12, a normalized log energy response curve for the IGFET sensor is shown generally by numeral 120. The response curve labelled numeral 122 illustrates the response of an uncompensated sensor showing dose enhancement effects. The response curve labelled numeral 124 shows a normalized response curve for a compensated IGFET sensor irradiated from the back of the sensor and the response curve labelled numeral 126 is for the same sensor irradiated from the front of the sensor. It will be appreciated that the foregoing description is presented by way of example only and is not intended to limit the scope of the present invention.

The embodiments of the invention in which an exclusive property of privilege is claimed are defined as follows:

1. A radiation dosimeter comprising:
   a pair of insulated gate field effect transistors integrated into the same silicon substrate, each said transistor being operable in a bias mode and a test mode; means for biasing, during said bias mode, each said transistor so that one of said transistors is more sensitive to ionizing radiation than the other of said transistors;
   means for determining, during said test mode, the difference in the threshold voltages of said transistors, said difference voltage being indicative of the radiation dosage; and
   means for continuously switching said transistors between said bias mode and said test model, the period of operation of said transistors in said test mode time period being small in comparison to the period of operation of said transistors in said bias mode.

2. A radiation dosimeter of claim 1 comprising digital voltmeter means for continuously measuring and displaying the differential threshold voltage between said transistors, said differential threshold voltage being representative of the radiation dosage.

3. The radiation dosimeter of claim 1 in which the means for determining the difference in threshold voltage of said transistors includes a single constant current source and constant current source switching means for switching the current source between said transistors for temperature stability during testing.

4. The radiation dosimeter of claim 3 in which means for determining the difference in threshold voltage of said transistors further includes sample and hold means.

5. The radiation dosimeter of claim 4 in which the means for continuously switching said transistors and constant current source switching means are comprised of CMOS switching devices.

6. The radiation dosimeter of claim 5 in which the insulated gate field effect transistor is an MOS P-channel device on an n-doped silicon substrate.

7. The radiation dosimeter of claim 6 in which the biasing means are sources of positive voltage of magnitude 6 volts and 3 volts respectively, applied to the gates of the transistors, making the transistor biased with the greater positive voltage more sensitive to radiation.

8. The radiation dosimeter of claim 7 in which the radiation sensor comprises a dual insulated gate field effect transistor component chip; a layer of epoxy covering said chip; first and second thin sheets of tin sandwiching said epoxy covered insulated gate field effect transistor component chip; and means for electrically connecting said dual transistors to external circuitry.

9. The radiation dosimeter of claim 8 further comprising means for resetting the difference in threshold voltage to zero.

10. The radiation dosimeter of claim 9 further comprising means for continuously displaying the difference in threshold voltage, indicative of radiation dosage.

11. The radiation dosimeter of claim 10 further comprising alarm means for providing a warning when the radiation dosage has exceeded a predetermined level.

12. The radiation dosimeter of claim 11 in which the duration of the test period is approximately 3 ms and the test period duration is approximately 2% of the duration of the combined bias and test periods.

13. The radiation dosimeter of claim 1 in which the means for continuously switching said transistors and the constant current source switching means are CMOS switching devices.

14. The radiation dosimeter of claim 1 in which the means for determining the difference in threshold voltage of said transistors further includes sample and hold means.

15. A radiation dosimeter comprising:
a pair of insulated gate field effect transistors integrated into the same silicon substrate, each having a gate, a source and a drain;
means for differentially biasing said transistors so that one of said transistors is more sensitive to ionizing radiation than the other of said transistors during exposure of said transistors to radiation;
means for determining the differential threshold voltage between the transistors, said differential voltage being representative of radiation dosages, said determining means including a single current source means and current source switching means for switching the current source between said transistors for providing temperature stability during testing.

16. A radiation dosimeter comprising;
a pair of insulated gate field effect transistors integrated into the same silicon substrate, each having a gate, a source and a drain, said transistors being operable in a bias mode and a test mode;
means for biasing said transistors during said bias mode so that one of said transistors is more sensitive to ionizing radiation than the other of said transistors;
means for determining during said test mode the differential threshold voltage indicative of the radiation dosage, said determining means including:
a single current source for providing a source-drain current for both of said transistors; and
current source switching means for connecting said single current source to the one of said transistors being tested so that both transistors are tested using the same current source so as to minimize temperature instability in the testing mode;
means for switching said transistors between said bias mode and said test mode at a predetermined frequency and for maintaining said transistors in each of said modes for predetermined intervals of time wherein the test mode time interval is a small relative to the bias mode time interval.

17. A method of continuously determining a radiation exposure dosage comprising the steps of:
(a) biasing one transistor in a dual insulated gate field effect transistor radiation dosimeter with respect to the other of said transistors so that one of said transistors is more sensitive than the other of said transistors to ionizing radiation during a predetermined bias period during which said dosimeter is exposed to radiation;
(b) switching said transistors into a test mode for a predetermined time to sample and hold the threshold voltage of one of said transistors;
(c) switching back to said bias mode for said bias period;
(d) switching back to said test mode for said test period to sample and hold the threshold voltage of the other of said transistors;
(e) determining the difference in said threshold voltages of said transistors;
(f) displaying said difference in threshold voltages, said difference in threshold voltages being representative of said radiation dosage; and
(g) continuously repeating the steps a) to f).

18. A method of measuring the differential voltage in a dual insulated gate field effect transistor radiation dosimeter to minimize temperature dependence comprising the steps of:
(a) connecting a constant current source to one transistor to provide a constant source-drain current;
(b) measuring the threshold voltage of that transistor;
(c) connecting said same constant current source to the other transistor to provide a constant source-drain current;
(d) measuring the threshold voltage of the said other transistor; and
(e) continuously repeating the steps a) to d).

19. A method of providing a continuous direct reading of accumulated radiation comprising the steps of:
(a) operating a dual insulated gate field effect transistor radiation dosimeter in a bias mode for a first predetermined period of time during which the transistors are differentially biased so that one is more sensitive to ionizing radiation than the other;
(b) operating said dual insulated gate field effect transistor radiation dosimeter in a test mode for a second predetermined period of time which is a fraction of said first period of time, including the steps of:
i. turning one of said transistors ON and the other of said transistors OFF;

ii. connecting a single constant current source to said one transistor so as to provide a constant source-drain current; and iii. sampling the threshold voltage of said one transistor;

(c) switching said transistors to said bias mode according to step (a) said first predetermined period of time;

(d) operating said dual insulated gate field effect transistor radiation dosimeter in a test mode for said second predetermined period of time, including the steps of:

i. turning the other one of said transistors ON and said one of said transistors OFF;

ii. connecting a single constant current source to the other of said transistors so as to provide a constant source-drain current; and iii. sampling the threshold voltage of said other of said transistors;

(e) determining the difference between the sampled threshold voltage of said one transistor and the sampled threshold voltage of the other of said transistors; and (f) providing a signal representative of said difference to a visual display to provide an indication of the accumulated radiation dose.

20. A radiation dosimeter comprising:

first and second insulated gate field effect transistors integrated into a single silicon substrate, each said transistor having a gate, a source and a drain;

a bias circuit for turning OFF both transistors by positive bias voltages applied to their respective gates, the bias voltage of one of said transistors being greater than the bias voltage of the other of said transistor;

a test circuit in which either of the transistors can be turned off the other turned on and connected to a constant current source to provide a constant source drain current and sample and hold circuitry to sample and hold the threshold voltage of the turned on transistor;

a switching circuit to connect the transistors into the bias circuit for a predetermined bias period during which the transistors are exposed to radiation and then to connect the transistors into the test circuit for a predetermined test period to sample to threshold voltage of one of the transistors;

a timing circuit to alternately switch between the bias and test circuitry for predetermined periods of time, the test circuitry time being significantly less than the bias circuitry time; and digital voltmeter means to measure and continuously display the difference between the threshold voltages and indicative of accumulated radiation dose.

21. A method of continuously determining a radiation exposure dosage comprising the steps of:

(a) biasing one transistor in a dual insulated gate field effect transistor radiation dosimeter with respect to the other of said transistors so that one of said transistors is more sensitive than the other of said transistors to ionizing radiation during a predetermined bias period during which said dosimeter is exposed to radiation;

(b) switching said transistors into a test mode for a predetermined time to sample and hold the threshold voltages of the transistors;

(c) determining the difference in said threshold voltages of said transistors;

(d) displaying said difference in threshold voltages, said difference in threshold voltages being representative of said radiation dosage; and (e) continuously repeating the steps a) to d).

22. A radiation sensor comprising:

a dual insulated gate field effect transistor component chip;

a layer of epoxy covering said chip;

means for electrically connecting said dual transistors to external circuitry; and first and second thin sheets of tin sandwiching said epoxy covered insulated gate field effect transistor component chip;

23. The radiation sensor of claim 22 in which the thin sheets of tin are each 0.5 mm in thickness.

24. The radiation sensor comprising:

a dual insulated gate field effect transistor component chip;

a layer of epoxy covering said chip;

means for electrically connecting said dual transistors to external circuitry; said transistor being bonded to a ceramic package and said package being covered by a high Z material lid.

* * * * *

UNITED STATES PATENT AND TRADEMARK OFFICE
CERTIFICATE OF CORRECTION

PATENT NO. : 5,117,113

DATED : May 26, 1992

INVENTOR(S) : Ian Thomson, et al

It is certified that error appears in the above-identified patent and that said Letters Patent is hereby corrected as shown below:

On the title page, Item [75], Inventor's addresses should read as follows: "MacKay's address" should read --104 Salter Crescent, Kanata, Ontario K2K 1Y7--; abd "Brown's address" should read --1310 Pinecrest Road, Apt. 410, Ottawa, Ontario K2C 3N8--;

Signed and Sealed this

Twenty-first Day of September, 1993

Attest:

BRUCE LEHMAN

*Attesting Officer*    *Commissioner of Patents and Trademarks*